Figure 1:
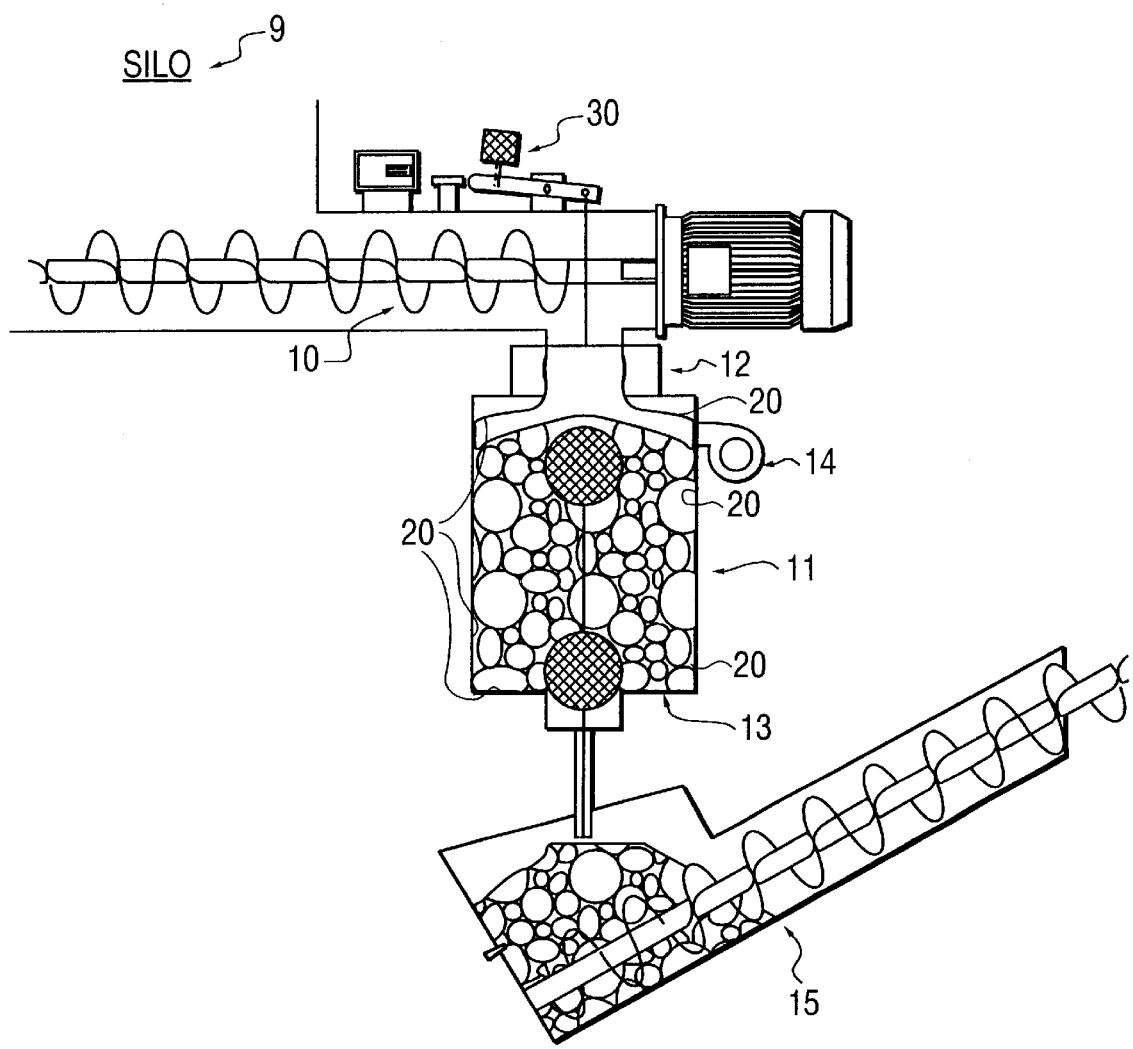

United States Patent

Haake

Patent Number: 6,047,857

Date of Patent: Apr. 11, 2000

[54] DEVICE FOR REMOVING BULK MATERIAL FROM A SILO

[76] Inventor: Hinrich Haake, Gut Stellmoor, D-22926, Ahrensburg, Germany

[21] Appl. No.: 09/117,737

[22] PCT Filed: Feb. 11, 1997

[86] PCT No.: PCT/EP97/00614

§ 371 Date: Aug. 5, 1998

§ 102(e) Date: Aug. 5, 1998

[87] PCT Pub. No.: WO97/29984

PCT Pub. Date: Aug. 21, 1997

[30] Foreign Application Priority Data

Feb. 19, 1996 [DE] Germany .................. 296 02 728 U
Nov. 6, 1996 [DE] Germany ..................... 196 45 598

[51] Int. Cl.⁷ .................................................. G01G 13/00
[52] U.S. Cl. ........................ 222/1; 222/77; 222/386.5
[58] Field of Search ............................. 222/1, 77, 386.5, 222/412, 413

[56] References Cited

U.S. PATENT DOCUMENTS 4,286,910 9/1981 Conrad .
4,728,004 3/1988 Bonerb ................................ 222/61
5,265,654 11/1993 Larsen ................................ 141/83

FOREIGN PATENT DOCUMENTS

0300113A1 1/1989 European Pat. Off. .
2 353 465 12/1977 France .
3123283A1 12/1982 Germany .

Primary Examiner—Steven O. Douglas
Assistant Examiner—Peter deVore
Attorney, Agent, or Firm—Lane, Aitken & McCann, L.L.P.

[57] ABSTRACT

A process for removing bulk material from a gastight silo. At the silo outlet (10) a container is connected in a gastight arrangement with an input valve and an output valve (12, 13) through which the container is evacuated before the bulk material is removed. In addition, a gastight membrane (20) is fitted in the container (11) in order to seal off the bulk material from the surroundings during the initial stages of the removal operation.

4 Claims, 2 Drawing Sheets

DEVICE FOR REMOVING BULK MATERIAL FROM A SILO

The invention relates to a device for removing bulk material from a gastight silo.

Silos are employed in agriculture to store ensilage and remove this material through the bottom of the silo as required. In connection with liquid feeding, use is made in the process preferably of a kind of siphon so that no oxygen can enter the silo during removal. Entry of oxygen would impair the quality of the feed, especially if the silo itself is no longer completely filled. It is also possible to ensure that no $CO_2$ can escape from the silo during such a removal process.

In the past, removal of dry feed from such a silo has necessarily been accompanied by losses of varying extent. First of all, $CO_2$ has been able to escape from the interior of the silo along with the dry feed. Then, oxygen has been able to enter the silo at the end of the removal process, invariably resulting in spoilage of the feed ensiled, especially during the early spring months, at a time when only little material is ensiled.

This invention now seeks to devise a remedy and provides devices for effecting the remedy.

In one embodiment of the invention, a vacuum is generated in a silo shortly in advance of the removal process proper, before the feed to be removed is introduced into this container. This ensures that no oxygen can be reintroduced into the silo.

In a second embodiment a cylindrical diaphragm is provided in a cylindrical silo. The feed to be removed is received into this diaphragm and in the process spreads to the interior circumference of the cylindrical silo. The connection to the silo is then interrupted and the feed present inside the diaphragm is removed. This arrangement always makes certain that no oxygen can reach the interior of the silo from outside.

It is not essential for the diaphragm provided to be cylindrical; a flat diaphragm which is situated in one of the diametral planes of a sphere and which alternately rests against one or the opposite spherical surface may just as well be used.

In an especially preferred embodiment of the invention the silo is fastened on a balance, so that the amount of feed removed may be precisely measured during removal.

Figure 2:
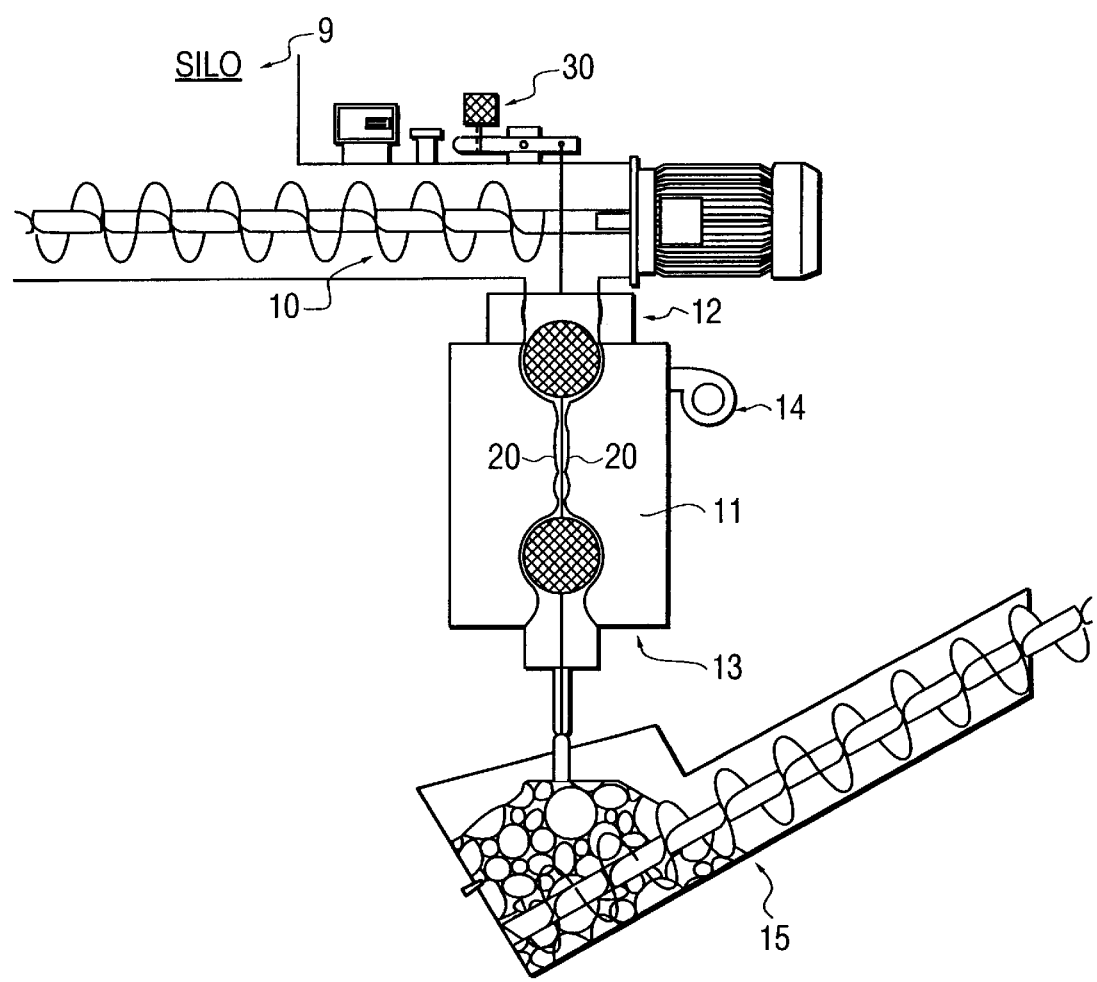

An example of the invention is described in what follows with reference to the drawing, in which FIG. 1 illustrates an embodiment of a removal device as claimed for the invention in a first operating state, FIG. 2 the removal device as claimed for the invention in a second operating state.

FIGS. 1 and 2 illustrate a delivery conveyor 10 in the bottom of a silo 9. The conveyor 10 is powered by an electric motor and delivers bulk material to the exterior from the interior of the silo 9. The bulk material reaches a cylindrical container 11 which may be sealed by a valve 12 at the top and a valve 13 at the bottom. Below the container 11 there is a receptacle, and a conveyor mechanism ensures delivery of the feed removed to the feeding station proper.

The mode of operation of the device is as follows. At the beginning of the emptying process, the lower valve 13 is closed and the upper valve 12 open (FIG. 1). In this manner the feed moves from the silo 9 to the container 11. The upper valve 12 is then closed and the lower valve 13 opened (FIG. 2). Before the emptying process is repeated the lower valve 13 is closed and the interior of the container 11 evacuated through the opening 14. A new emptying process, in which the upper valve 12 is opened, may then be initiated.

In the interior of the container 11 there is a cylindrical diaphragm 20 which is fastened at the top and bottom of the container as required.

The mode of operation of the diaphragm is as follows:

At the beginning of an emptying process, material is moved through the opened valve 12 into the interior of the diaphragm 20 by the conveyor, the diaphragm ultimately coming to rest against the wall of the container 11. The upper valve 12 is then closed and the lower valve 13 open, so that the material present in the interior of the diaphragm 20 is discharged downward. This emptying process may be promoted by compressed air introduced by way of the opening 14. FIG. 2 illustrates the diaphragm as emptied, when it has collapsed onto itself and thus encloses zero volume, in contrast to the charged state (FIG. 1) in which it rests tight against the inside wall of the container 11.

The numeral 30 denotes a balance on which the container is suspended so that the amount of feed removed may be weighed.

What is claimed is:

1. A process for gastight removal of free flowing bulk material from a gastight silo (9) while preventing oxygen from entering the gastight silo from outside, comprising:

providing a gastight silo having an outlet opening;

providing a container having a wall, an inlet, an outlet, an inlet valve, an outlet valve, an additional connection, and a diaphram, the diaphragm being in the container and generally cylindrical in shape;

providing a gastight connection from the outlet opening of the gastight silo to the inlet of the container;

closing the outlet valve and opening the inlet valve of the container;

feeding bulk material from the gastight silo into the diaphragm when the inlet valve is open and the outlet valve is closed, wherein the diaphragm is deflected into abutment with the wall of the container;

closing the inlet valve and opening the outlet valve; and emptying the bulk material in the diaphragm downward when the inlet valve is closed and the outlet valve is open.

2. A process as claimed in claim 1, wherein the container has a region inside the container and surrounding the diaghragm, and wherein said region is evacuated by way of the connection (14) when the inlet valve (12) is open, and wherein said region is pressurized by way of the connection (14) when the inlet valve (12) is closed and the outlet valve (13) is open.

3. A process as claimed in claim 1, wherein the container (11) is weighed by means of a balance.

4. A process as claimed in claim 1, wherein the free flowing bulk material is silage, and the step of feeding comprises feeding silage from the gastight silo into the diaphragm.

* * * * *